(12) United States Patent
Furusho et al.

(10) Patent No.: US 6,310,604 B1
(45) Date of Patent: Oct. 30, 2001

(54) VIRTUAL REALITY AND TELEREALITY SYSTEM

(75) Inventors: Junji Furusho, Chofu; Akihito Sano, Gifu; Akio Inoue, Fuji, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 08/776,054

(22) PCT Filed: Jul. 18, 1995

(86) PCT No.: PCT/JP95/01426

§ 371 Date: Jan. 17, 1997

§ 102(e) Date: Jan. 17, 1997

(87) PCT Pub. No.: WO96/02887

PCT Pub. Date: Feb. 1, 1996

(30) Foreign Application Priority Data

Jul. 19, 1994 (JP) .................................................. 6-166791

(51) Int. Cl.⁷ .................................................. G09G 5/00
(52) U.S. Cl. .......................................... 345/156; 345/157
(58) Field of Search ..................................... 345/161, 184, 345/156, 157, 158, 163, 168, 173; 340/407.1; 364/410; 463/31; 482/4, 52; 251/5

(56) References Cited

U.S. PATENT DOCUMENTS

| 4,752,878 | * | 6/1988 | Sigurdsson et al. ................. 364/410 |
| 5,071,581 | * | 12/1991 | Cipriano ................................. 252/77 |
| 5,143,505 | | 9/1992 | Burdea et al. . |
| 5,316,261 | * | 5/1994 | Stoner ..................................... 251/5 |
| 5,451,924 | * | 9/1995 | Massimino et al. ............... 340/407.1 |
| 5,577,981 | * | 11/1996 | Jarvik ........................................ 482/4 |
| 5,734,373 | * | 3/1998 | Rosenberg et al. ................... 345/161 |
| 5,810,696 | * | 9/1998 | Webb ..................................... 482/52 |
| 5,830,065 | * | 11/1998 | Sitrick .................................... 463/31 |

FOREIGN PATENT DOCUMENTS

| 43 32 580 | 3/1995 | (DE) . |
| 2 263 179 | 7/1993 | (GB) . |
| 2 263 179 A | 7/1993 | (GB) . |
| 2 265 746 | 10/1993 | (GB) . |
| 5-333171 | 12/1993 | (JP) . |
| 6-274226 | 9/1994 | (JP) . |

OTHER PUBLICATIONS

Monkman "3–D Tactile Image Display," Sensor Review, vol. 13, No. 2, (1993), pp. 27–31.
Kasai et al. "Realization on Operating Fieling of Virtual Object Using Electro–Rheological Fluid," Collection of Materials For the Twelfth Scientific Lectures by the Institute of Robotics, vol. 12, No. 2, pp. 645–646, (1994).
European Search Report No. 97/87011 WO EP Sep. 5, 1997.
Tate, "Teleexistence", Measurement and Control, SICE, 30(6):465–471 (1991).
M. Sato, "Force Display for Virtual Reality", J. Tele. Soc., 46(6):681–684 (1992).
M. Sato et al., "Space Interface Device for Artificial Reality –SPIDAR–", Technical Research Report of IEICE, PRU–89–88, p. 51–58 (1989). (submitted with English language abstract).
Form PCT/ISA/210 for PCT/JP95/01426.

\* cited by examiner

*Primary Examiner*—Xiao Wu
(74) *Attorney, Agent, or Firm*—Finnegan, Henderson, Farabow, Garrett & Dunner, L.L.P.

(57) ABSTRACT

A virtual reality or telereality (teleexistece) system which displays to an operator the changes in force senses caused by the variation of flow resistance of an electrorheological fluid by making the flow resistance, which is varied in response to the intensity of the electric field applied to the electrorheological fluid, cooperated in real time with an image (virtual world) generated by a computer or a really existing world (telereal world) connected through the intermediary of a robot.

34 Claims, 16 Drawing Sheets

PASSIVE

ACTIVE

VIRTUAL REALITY AND TELEREALITY SYSTEM

TECHNICAL FIELD

The present invention relates to virtual reality and telereality employed in various fields such as design, education, training, amusement, hazardous operation, micromanipulation/supermicromanipulation, and more particularly to virtual reality system and telereality system which display to an operator, in real time, force senses in a virtual world created by a computer or in a telereal world which actually exists, by using control mechanism that electrically varies flow resistance of an electrorheological fluid.

The virtual reality system and telereality system in accordance with the present invention are also utilized as a haptic interface that displays information perceived by a motor-sensory system, that is, information associated with mechanical force senses involved in body movement.

TERMINOLOGY

The term "virtual reality" in the present invention refers to a world of images such as computer graphics created on a display by a computer. The images may be formed on any of a CRT, screen, flat display, and 3D (3-dimensional) display. Although the images formed on the visual display are synchronized in real time with the flow resistance of the electrorheological fluid in a force display device as in the telereal world, real force effect is not involved as in the telereal world. The term "real time" in the present invention refers to a fact that no substantial delay is present although a very short delay is allowed in image processing, or electrical or mechanical transmission.

The term "telereal world" in the present invention refers to a world in which mechanical forces are exerted such as operations in extreme environments in various fields like nuclear power, sea, disaster prevention, or space, or micromanipulation/supermicromanipulation in various fields like medical treatment, electronic components, micromachining. In other words, it is a telereal world in which mechanical forces are exerted by the operator of the force display system via a mechanical medium such as a robot or manipulator, and a real world in which, are exerted the same mechanical or physical laws as in the world the operator is present. Therefore, the world in which the operator of the force display system is present is synchronized with the telereal world in which the mechanical forces are exerted are performed in real time.

The term "virtual reality system" in the present invention refers to a system that provides an operator with real time telepresence as if he or she were present, and acted or worked in the virtual world created by a computer. Although conventional systems mainly appeal to the eye and/or ear, the system in accordance with the present invention appeals to force senses, as well.

The term "telereality system" in the present invention refers to a system that provides an operator with real time telepresence as if he or she experienced events in a unique real world such as extremely fine, hazardous, or bad environment through a mechanical medium like a robot, thereby appealing with real time presence to the various senses of the operator, particularly to the force senses.

The term "teleexistence system" in the present invention includes both the virtual reality system and the telereality system.

The term "force sense" refers to a tactile or bodily sensation, that is, senses accompanying the movement of man's hands and feet, or actions on external objects. The tactile sensation includes senses such as soft, hard, heavy, light, strong, elastic or viscous associated with actions such as push, pull, touch, grasp, turn, hit, or kick, and the bodily sensation includes similar senses involved in actions such as press, draw, or tightening.

The term "force display device" refers to a device implemented in the form of gloves, fingers, arms, grips or elbows, which are analogous to man's counterparts. The force display device in accordance with the present invention which utilizes electrorheological fluid can be implemented by simpler and more compact structure than the conventional purely mechanical device.

The term "mechanical variables" refers to variables such as position, angle, distortion amount, velocity, force, pressure, acceleration. Sensors for detecting these variables are generally mounted on the force display device. They are often mounted on the output system which performs mechanical operation in the telereal world.

The term "electrorheological fluid" refers to fluid whose viscosity changes instantaneously and reversibly when electric field is applied thereto, and is roughly divided into dispersion electrorheological fluid and homogeneous electrorheological fluid. The dispersion electrorheological fluid is formed by dispersing dielectric particles into insulating oil, whereas the homogeneous electrorheological fluid does not use particles. The dispersion electrorheological fluid employs particles such as:
(1) Inorganic particles.
   Silica or zeolite containing ionically polarizable water, acid or alkali, or organic electrolyte.
(2) Organic particles.
   Ion exchange resin, or cellulose.
(3) Semiconductor particles.
   Carbon or polyaniline or metallo phthalocyanine which contains no water and causes electronic polarization rather than ionic polarization.
(4) Metal particles or electroconductive polymer particles having insulating thin films coated on their surfaces.
(5) Particles composed of materials with conductivity anisotropy and nonlinear optical characteristic.

Besides, the following insulating oils are generally used which are stable in electric insulation, in addition to stable mechanical, physical and chemical characteristics: for example, silicone oil, fluorocarbon oil, mineral oil, paraffin, aromatic ester oil, aliphatic cyclic compound ester oil, natural oil.

On the other hand, as the homogeneous electrorheological fluid, it is preferable to use materials or their solution with such properties as liquid crystal, viscosity anisotropy, amphiphilic, ferroelectricity, and high dipole moment. In particular, liquid crystal, especially liquid crystalline polymer is preferable.

The dispersion electrorheological fluid generally exhibits Bingham fluid characteristic in which the shear stress is nearly constant independently of the shear velocity when electric field is applied. On the other hand, the homogeneous electrorheological fluid generally shows so-called Newtonian Flow characteristic in which the shear stress is proportional to the shear velocity.

BACKGROUND ART

The virtual reality or teleexistence technology flourishes which provides real time telepresence where we have the illusion that we are really present and work in the virtual reality created by a computer or in the telereal world which actually exists in a very fine or hazardous environment. To make a human operator feel as if he or she were in that place, a high performance force display device is essential. In addition, it is necessary to conduct wide spectrum of research on the entire systems including sensors, actuators, and computer systems associated with the force display devices.

The following techniques are reported on the force display device used in the virtual reality system.

(1) M. Minsky, et al. disclose in ACM SIGGRAPH, Vol. 24,235, 1990, a "virtual sandpaper" that provides fingers with the surface texture of a virtual object. It has a sensor for detecting positions in all movable directions, and expresses texture by resistance created by a special big joy stick including motors and brakes, each of which is mounted on each shaft of the joy stick, thereby providing a hand with the surface texture of the virtual object.

(2) Iwata, et al. disclose in ACM SIGGRAPH, vol. 24,165, 1990, a device that provides operator's fingers and hand with force senses through a special disk top manipulator when he or she touches a virtual object. The disk top manipulator has a configuration with many small, metal pantograph arranged ingeniously, and provides the force which is generated by a mechanism including motors to fingertips inserted thereto.

(3) Hashimoto, et al. disclose in Journal of the Robotics Society of Japan, Vol. 10,903, 1992, a glove for analyzing the movement of a human hand. The glove is called a sensor glove driven by motors combined with wire transmission, and has three fingers and ten degrees of freedom.

(4) Sato, et al. disclose in the Transactions of the Institute of Electronics, Information and Communication Engineers of Japan, D-2, Vol. 7,887, 1991, a technique which generates senses when touching an image on a display seen through a stereoscope by controlling tensions of a few wires connected to fingers using solenoids.

(5) Hattori, in Rutgers University, discloses in "Artificial Reality World", Kogyo Tyosakai publishing company Ltd. 151, 1991, a technique for generating mechanical force when fingertips touch a virtual object, thereby providing the fingers with the sense as though the virtual object were actually present at the place. This device has micro cylinders mounted on thumb, index finger and middle finger, and a pump joined to the micro cylinders to supply air in real time, thereby generating push back forces on the fingers by supplying air pressure when the fingertips touch the virtual object.

(6) Tanaka, et al. disclose in Japanese Patent Application Laid-open No. 6-507032/1994 (PCT/GB92/00729), and in Proceedings of the 71 JSME Spring Annual Meeting of the Japan Society of Mechanical Engineers, No. 4,373, 1994, a fluid glove which is worn on an operator's hand to provide force sense display. The fluid glove implements (tactile) operation sense corresponding to the grasp of a robot by controlling the pressure of the fluid (air).

Using the electrorheological fluid for controlling mechanical outputs is described in the following documents.

(1) German Patent DE3830836C2 discloses a technique which applies the electrorheological fluid to a power simulator of an airplane. It relates to a kind of servo support equipment for aiding muscular operations or preventing over actions as in the power steering of automobiles.

(2) Ikeda, et al. discloses in the Proceedings of the 11-th Annual Conference of Robotics Society of Japan, 987, 1993, a technique which applies the electrorheological fluid to the output control of a biomimetic actuator. It relates to a controlling device of the mechanical output of artificial muscular.

All the devices employing the electrorheological fluid relate to the control of mechanical outputs rather than the display of force senses, particularly the force display of the virtual reality system.

The foregoing conventional force display devices have various problems. For example, the devices using motors are large, limited in degrees of freedom, and inferior in response. The devices using solenoids or air cylinders have poor controllability, and difficulty in the display of delicate senses.

DISCLOSURE OF THE INVENTION

An object of the present invention is to provide a teleexistence system including a compact force display device which can provide multiple degrees of freedom, delicate display of force senses, and good telepresence.

To achieve the object, the inventors of the present invention have grasped a concept of applying the electrorheological fluid whose viscosity is electrically variable not only to the control of mechanical output, but also to the sense display using the variations of the flow resistance due to viscosity changes of the electrorheological fluid, and have carried out intensive research on it to complete the present invention.

According to the present invention, there is provided a teleexistence system which displays a force sense to an operator in response to operator's action to an environment provided in the form of an image. The teleexistence system comprises:

an image exhibiting unit for displaying the image in response to a given image signal;

a computer for generating a force sense signal corresponding to the force sense;

a force display device including control means for electrically changing flow resistance of an electrorheological fluid in response to the force sense signal, and force providing means for providing the operator with a force controlled by the flow resistance.

Here, the teleexistence system may further comprise a sensor for detecting mechanical variables of the force display device, wherein an output signal from the sensor is fed back to the computer, so that the computer controls at least one of the force display device and the image display unit in response to the output signal from the sensor.

The force display device may further comprise a driving system for driving the force providing means.

The environment provided in the form of an image may be a telereal world, and the teleexistence system may further comprise image pick up means for outputting the image signal by picking up the telereal world, and a telereal world sensor for detecting mechanical actions in the telereal world and for feeding an output signal of the telereal world sensor back to the computer, wherein the computer generates the force signal in response to at least one of the image signal output from the image pick up means and the output signal from the telereal world sensor to provide the force signal to the force display device.

The environment provided in the form of an image may be a virtual world, and the computer may store images of the virtual world in advance, supply the image signal to the image display unit in response to the images of the virtual world, and supply the force signal to the force display device in response to the images of the virtual world.

The electrorheological fluid may be an electrorheological fluid exhibiting Bingham flow when electric field is applied to the electrorheological fluid.

The electrorheological fluid may be an. electrorheological fluid exhibiting Newtonian flow when electric field is applied to the electrorheological fluid.

The electrorheological fluid may be composed of an electrorheological fluid exhibiting Bingham flow and an electrorheological fluid exhibiting Newtonian flow when electric field is applied to the electrorheological fluid.

The present invention is featured in that it adopts a device using an electrorheological fluid as a force display device. Since the electrorheological fluid changes its viscosity in accordance with the intensity of the electric field applied thereto, its flow resistance can be controlled by the intensity of the electric field. This type of the force display device can make reduce the mass of an output portion, and hence can remarkably increase an output/inertia ratio. Thus, the force senses perceived in the virtual world or the telereal world can be displayed with a feeling close to a real one. Furthermore, a force display device with multiple degrees of freedom can be implemented in a simple and compact structure. As a result, a compact virtual reality system or telereality system with an excellent force display function can be implemented by synchronizing the force display device with an image display unit by a computer.

BRIEF DESCRIPTION OF THE DRAWINGS

FIGS. 14 and 15 are diagrams showing EMBODIMENT 5 of the teleexistence system in accordance with the present invention, wherein FIG. 14 is a perspective view showing a force display system capable of displaying the force sense on the XY plain, and FIG. 15 is a block diagram showing a virtual reality system using the force display device;

FIGS. 16–18 are diagrams showing EMBODIMENT 6 of the teleexistence system in accordance with the present invention, wherein FIG. 16 is a block diagram showing the overall structure with focusing on the force display device, FIG. 17 is a cross-sectional view showing an electrode unit, and FIG. 18 is a view showing a state when thumbs and four fingers grasp a virtual object 9;

BEST MODE FOR CARRYING OUT THE INVENTION

Embodiments

The present invention will now be described in more detail. First of all, the outline of the teleexistence system in accordance with the present invention will be explained.

Figure 1:
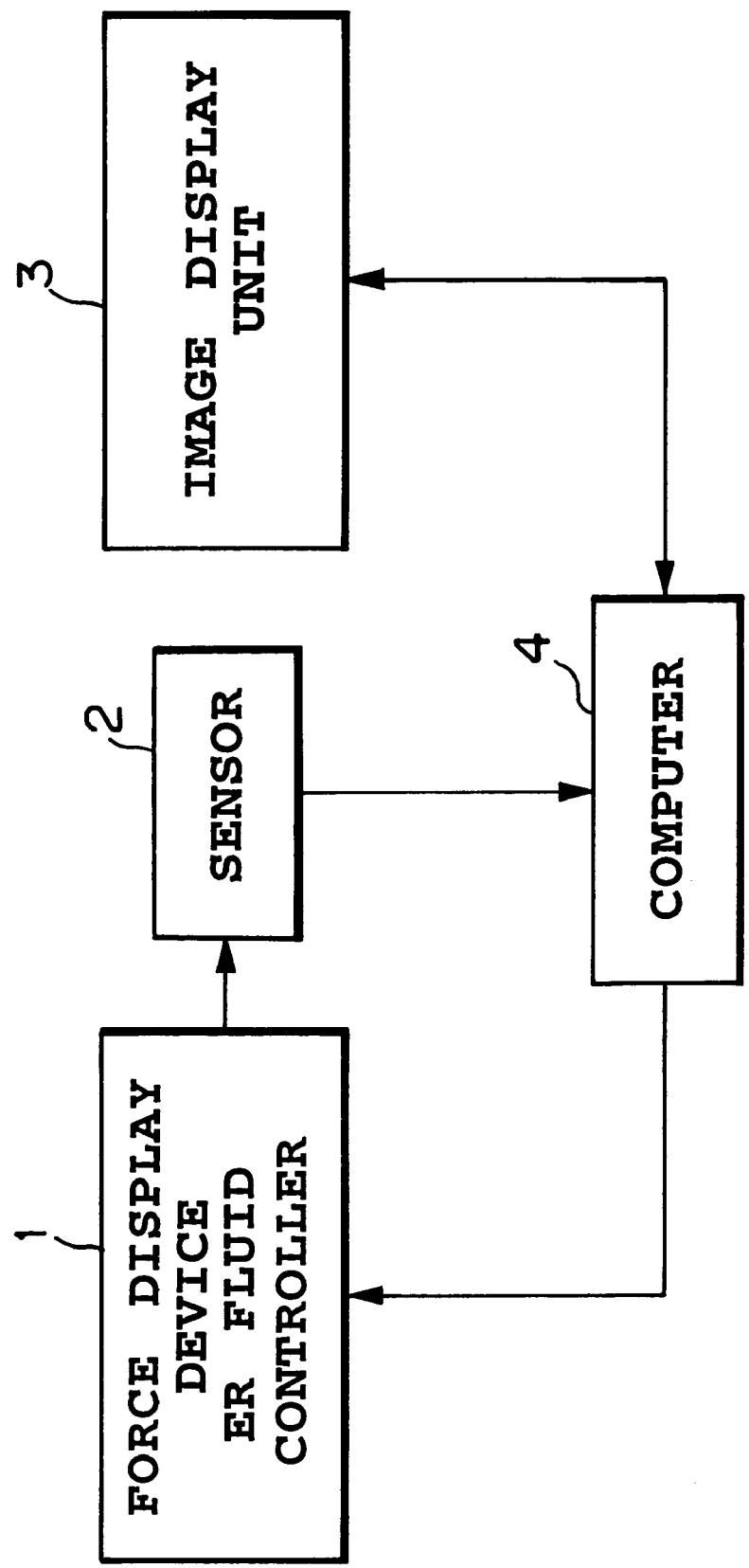
FIG. 1 is a block diagram schematically showing a virtual reality system in accordance with the present invention.
Figure 2:
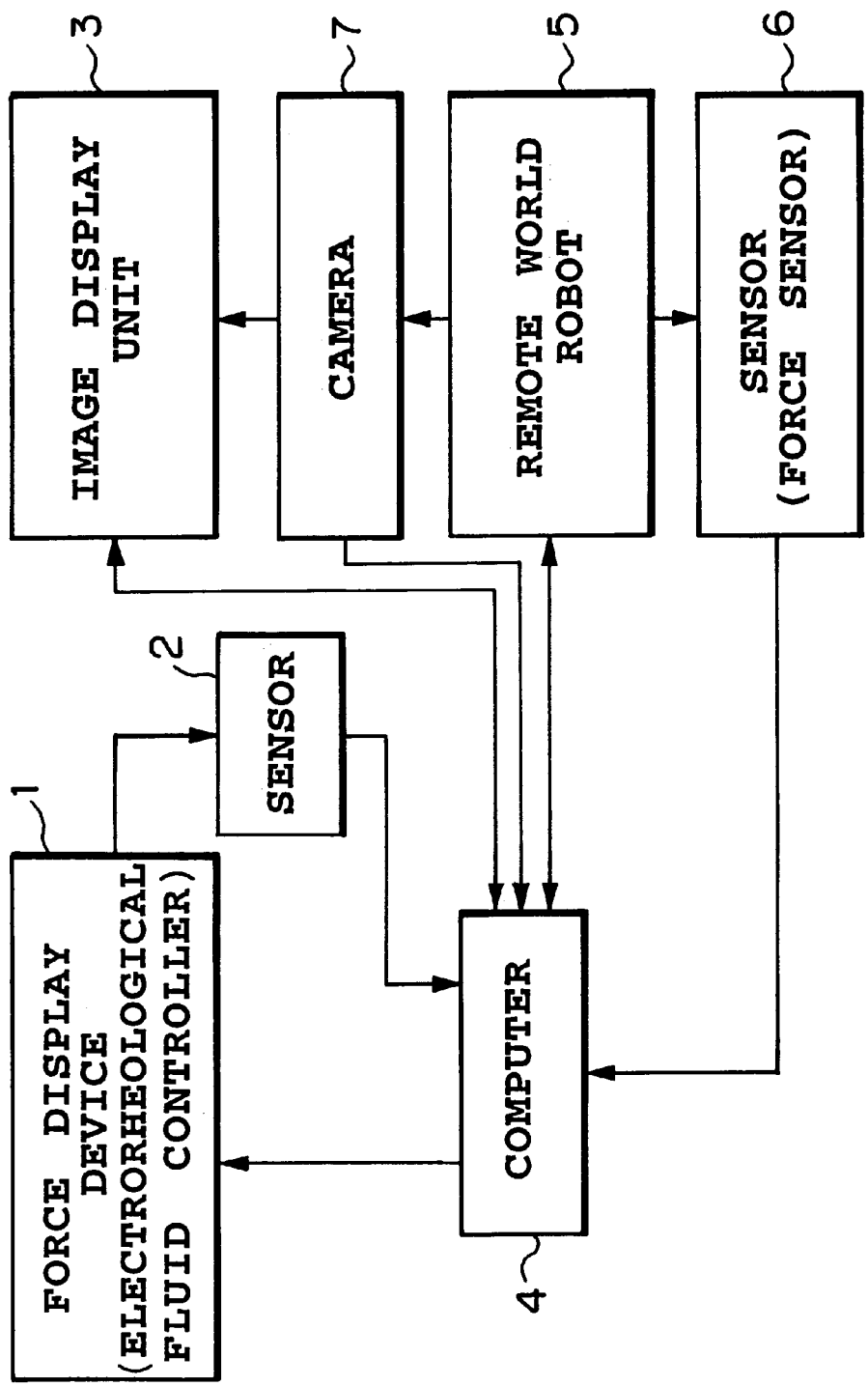
FIG. 2 is a block diagram schematically showing a telereality system in accordance with the present invention.

FIGS. 1 and 2 are block diagrams schematically showing teleexistence systems in accordance with the present invention. FIG. 1 shows a virtual reality system and FIG. 2 shows a telereality system.

The virtual reality system has a force display device 1, a sensor 2, an image display unit 3, and a computer 4. The sensor 2 is connected to the force display device 1 to detect its mechanical variables which are fed back to the computer 4. The sensor 2, however, is not essential to the system. The image display unit 3 displays a virtual world to show it to an operator of the virtual reality system.

The telereality system shown in FIG. 2 includes, in addition to the virtual reality system shown in FIG. 1, a robot 5 operating in a real telereal world, a sensor 6 for detecting the position and motion of the robot 5, and a camera 7 for picking up the image of the telereal world, in which the image display unit 3 displays the telereal world instead of the virtual world. As the sensor 6, a force sensor is used for detecting the mechanical operation in the telereal world. The force display device 1 is incorporated into the operating means of the robot 5. An image signal from the virtual world which is acquired by the camera 7 may be directly fed to the image display unit 3 and computer 4, or to the computer 4 through the image display unit 3. Reversely, it may be fed to the image display unit 3 via the computer 4. The signal from the sensor 6 is fed back to the computer 4 to control the force display device 1 and/or the image display unit 3.

The force display device 1 in these systems, includes a controller for electrically changing the flow resistance of the electrorheological fluid, and is classified into a passive force display device and an active force display device.

Figure 3:
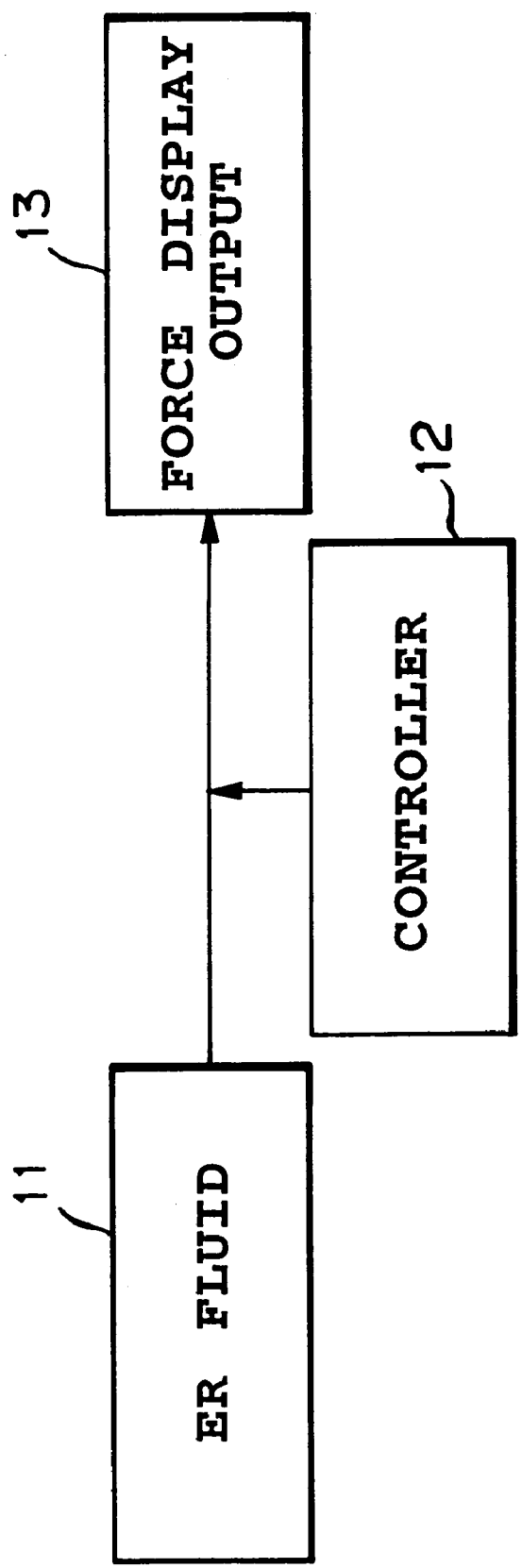
FIG. 3 is a block diagram illustrating an operation scheme of a passive force display device.

FIG. 3 shows a passive force display device which electrically controls the viscosity of the electrorheological fluid (ER fluid) 11 by a controller 12 to change the flow resistance, thereby obtaining a force display output 13. The passive force display device employs one of the following mechanisms.

(a) A structure which includes the electrorheological fluid filled in the space between fixed parallel plate electrodes or coaxial (multiple) cylinder type electrodes, and which changes the flow resistance (or fluid pressure) of the electrorheological fluid by controlling its viscosity by applying an electric field to the electrorheological fluid.

(b) A structure which includes the electrorheological fluid filled in the space between electrodes one of which is fixed and the other of which is movable, in the form of parallel plates or coaxial double (or multiple) cylinders, and which changes the flow resistance (or shear stress) during the movement of the movable electrode by controlling the viscosity of the electrorheological fluid by applying an electric field thereto. The movement of the movable electrode is sliding movement when the movable electrode is one of the parallel plates, and rotation around the axis when it is one of the coaxial cylinders.

The force display device employing such controllers is usually implemented in the form of an orifice composed of a double or multiple coaxial cylinders, a combination of a cylinder and piston, or one or more pairs of parallel plates in the form of slits, sliders, disks, or flanges.

Figure 4:
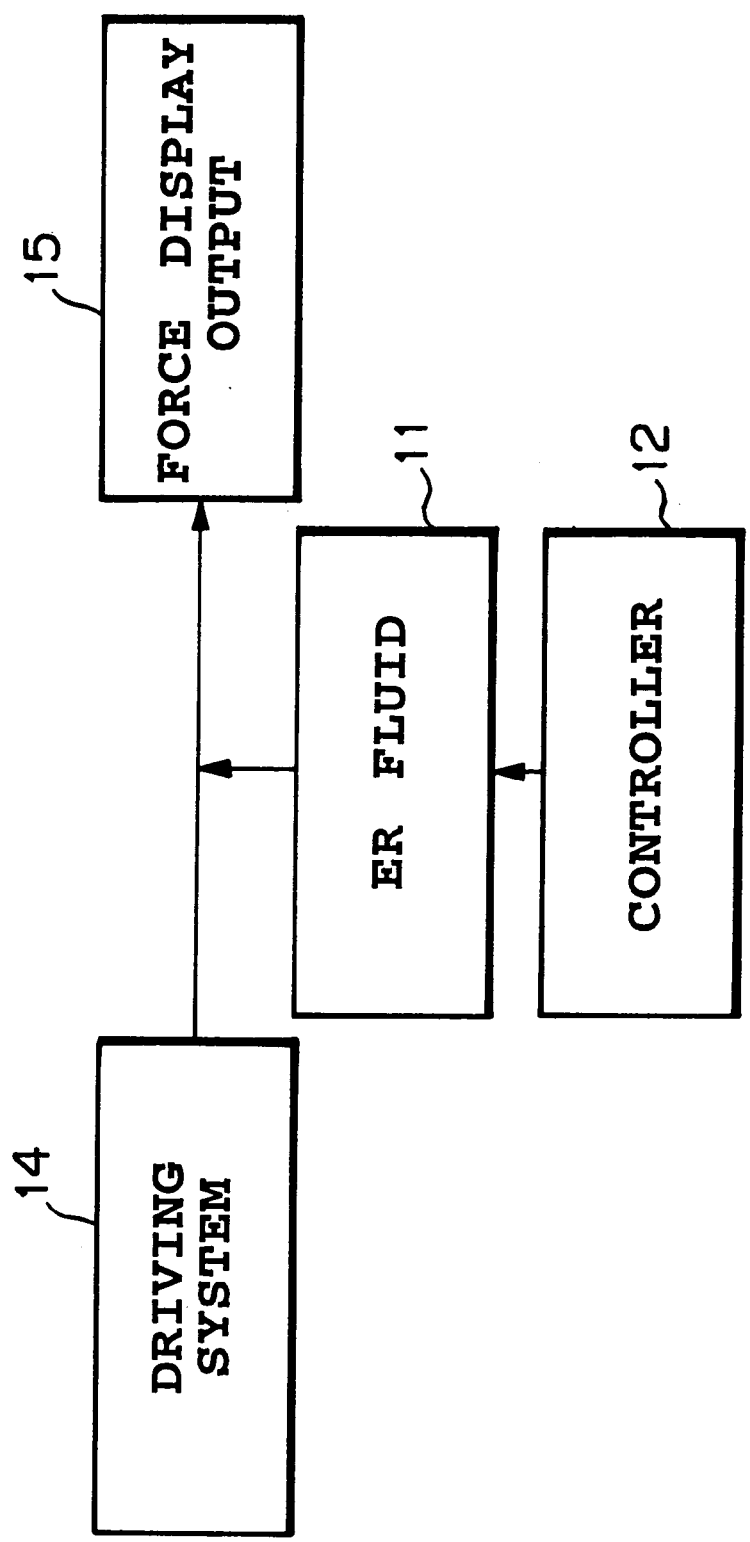
FIG. 4 is a block diagram illustrating an operation scheme of an active force display device.

FIG. 4 shows an active force display device. It electrically controls the electrorheological fluid 11 with the controller 12 to change the flow resistance so that the output from a driving system 14 is controlled by the flow resistance to produce the output as a force display output 15.

In other words, the active force display device controls the mechanical output of the driving system by the flow resistance of the electrorheological fluid. Its structure is similar to that of the passive force display system, and its output mechanism usually takes a form of the cylindrical type or parallel plate type.

As a driving system of the active force display device, external drivers such as motors, solenoids, air pressure, oil pressure, wires, or internal drivers using self-shape recovery force, such as springs, leaf springs, wire springs, rubber, or elastomer are used individually or in combination.

The computer 4 controls the force display device 1 and image display unit 3 in synchronism in accordance with the database and program which are input in advance. The computer 4 processes a signal from the sensor 2 and/or a signal from the image display unit 3 to supply the processing results to the force display device 1. In addition, the computer 4 calculates the intensity of an electric field to be applied to the electrorheological fluid in accordance with the database and program stored in advance, or the signal from the sensor 2 to change the electric field in response to the calculation result, thereby controlling the flow resistance of the electrorheological fluid. The computer 4 in the telereality system as shown in FIG. 2 further carries out the synchronization with the telereal world. This can be carried out by another computer which supplements the computer 4.

The force display device 1 employing an electrorheological fluid exhibiting the Bingham fluid, in which the shear stress is nearly constant regardless of the shear velocity, excels in the reproduction and display of resistance due to solid friction. Thus, the feeling of resistance at the beginning (start) or end (stop) of actions such as push, draw, grasp, turn, kick is displayed with a feeling close to a real one. On the other hand, the force display device 1 employing the electrorheological fluid exhibiting the Newtonian flow, in which the shear stress is proportional to the shear velocity, excels in the reproduction and display of the viscosity resistance. Accordingly, the feeling of resistance in the process of successive operations such as touch, search, squeeze, turn is displayed with a feeling close to a real one. Thus, all types of operations can be displayed with a feeling close to a real one by using the electrorheological fluid exhibiting the Bingham fluid and that exhibiting the Newtonian flow in combination, and by controlling them independently.

The feeling displayed by the force display device 1 is represented by the passive force based on only the flow resistance of the electrorheological fluid, or the active force due to the combination of the output of the driving system and the flow resistance. Since the electrorheological fluid does not produce driving force by itself, there is no fear that the passive force exceeds the force generated by the operator.

Therefore, the passive force is appropriate to implement a safe force display device. The actual force display, however, often requires an active force which combines the passive force with a driving force.

The force display device in accordance with the present invention carries out the display by electrically changing the flow resistance of the electrorheological fluid, in which the electroheological fluid changes its flow resistance in good electrical response. It is more compact and faster in response than the conventional force display devices, because it uses smaller number of mechanical components than the conventional ones. Furthermore, it can remarkably reduce the mass of the output parts as compared with motors or the like, thereby achieving a large output/inertia ratio. As a result, it can achieve the output with a desired acceleration, frequency or waveform. This makes it possible, for example, to exhibit or reproduce delicate forces represented by a wording such as tap, rub, pat, picking, massage, numb. In other words, it enables various colors to be put on the force, thereby achieving the display of the force sense superior to the conventional ones. As a result, a virtual reality system or telereality system can be implemented which provides an excellent sense of being at that place.

These teleexistence system can incorporate, in addition to the force display device 1 and image display unit 3, a device for displaying the tactile senses associated with hearing, smell, taste, pain, itch, to operate it in synchronism through the computer 4 or another computer.

The embodiments of the present invention will now be described in more detail referring to the accompanying drawings.

Embodiments 1

Figure 5:
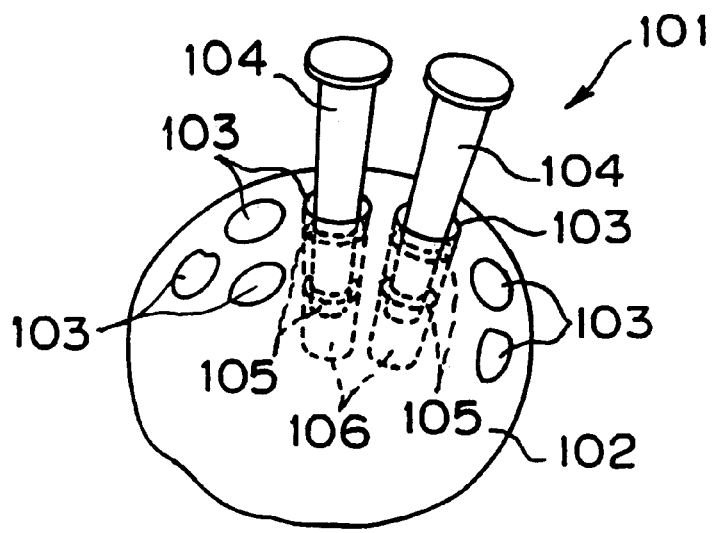
FIG. 5 is a perspective view showing the structure of a shape recovery ball which constitutes a basic portion of the glove type force display device used in EMBODIMENT 1 of a teleexistence system in accordance with the present invention.
Figure 6:
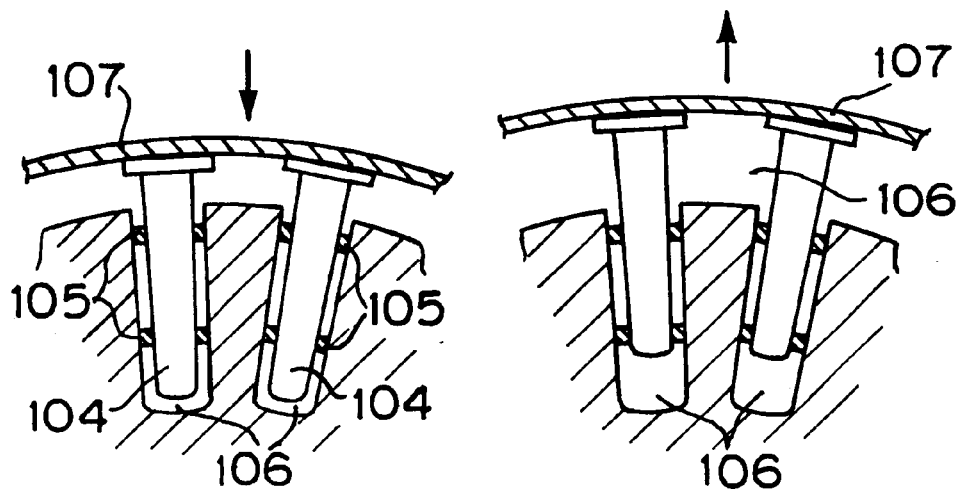
FIG. 6 is a cross-sectional view illustrating the structure near the surface of the shape recovery ball in FIG. 5.
Figure 7:
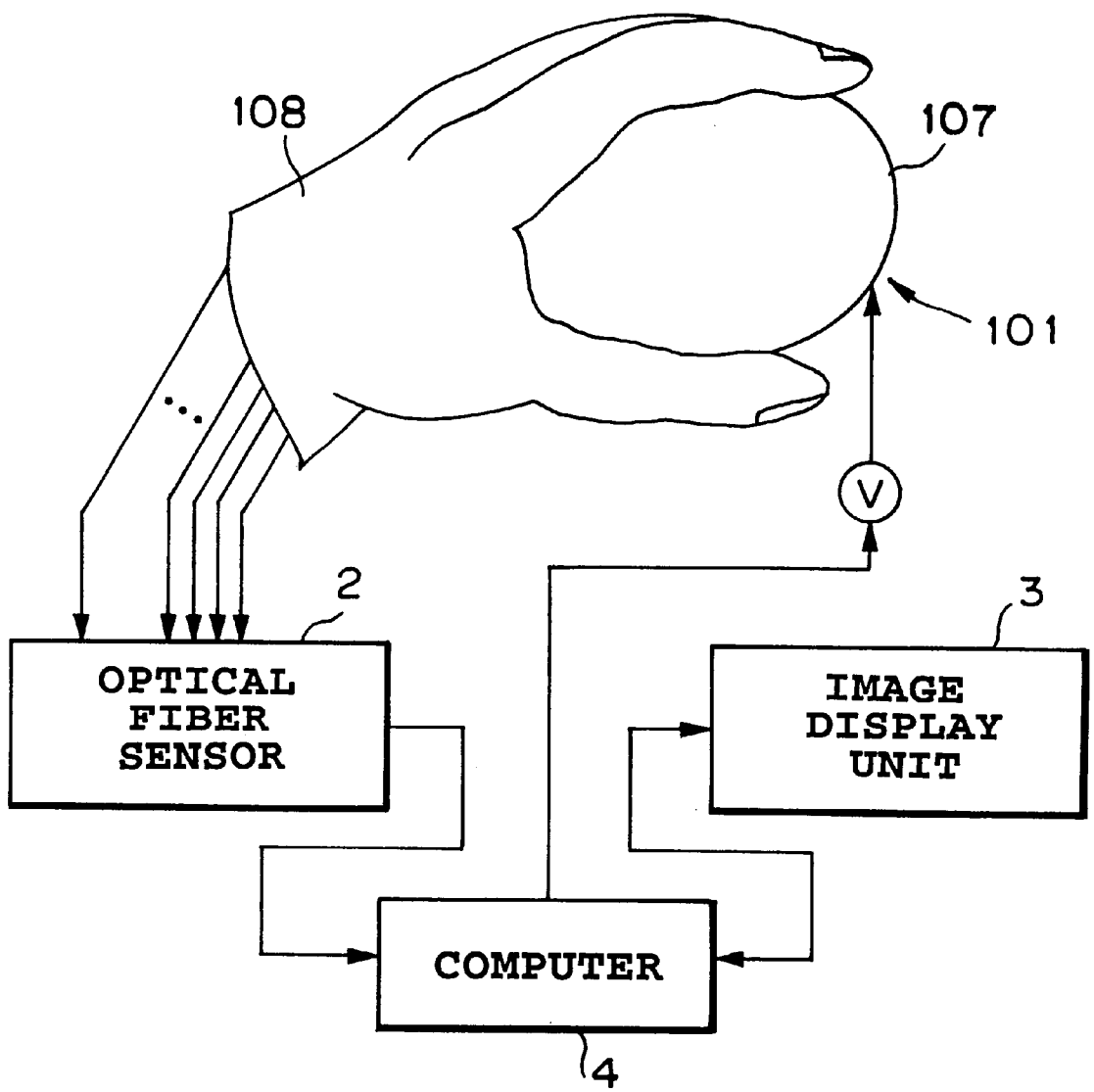
FIG. 7 is a block diagram showing the entire configuration of EMBODIMENT 1 of the teleexistence system in accordance with the present invention, which centers on a perspective view illustrating the shape recovery ball in FIG. 5 attached to a data glove.

FIGS. 5–7 show an embodiment of the virtual reality system in accordance with the present invention. The embodiment is an example of the virtual reality system comprising a glove type force display device using the electrorheological fluid.

FIG. 5 is a perspective view showing the internal structure of a shape reproducing ball 101, a basic structure of the glove type force display device. The device has a ball 102 having a surface on which many cylindrical holes 103 are formed. In each hole 103, there is inserted a pin 104 in such a manner that a fixed width space is kept between the pin 104 and the inner wall of the hole 103 by an insulating partial spacers 105. The electrorheological fluid is filled in the space and the interior of the hole. The electrorheological fluid 106 can easily move in response to the movement of the pins 104 through a fluid tank (not shown) in the ball and the spaces formed by the partial spacers 105. The ball 105 forms a negative electrode, and the pins 104 form positive electrodes to which leads are arranged to apply voltages independently. The ball 102 is an aluminum ball of 40 mm diameter. The holes 103 are 5 mm in diameter, and the pins 104 are a 4 mm diameter and 25 mm long aluminum pin with a resinous flat head. Thus, the spaces between the pins 104 and the inner walls of the holes 103 are 0.5 mm in width, and are positively maintained by the Teflon spacers 105.

FIG. 6 shows cross-sectional views of the surface of the shape recovery ball 101. The ball 102 is wholly enveloped with a rubber-ball-like rubber 107, and the flat heads of the pins 104 are stuck on the inner wall of the rubber ball 107. The diameter of the rubber ball 107 is 55 mm. The electrorheological fluid 106 is filled not only in the space between the pins 104 and the holes 103, which is maintained at a fixed width by the spacers 105, and in the interior of the holes 103, but also in the space between the inner wall of the rubber ball 107 and the surface of the ball 102.

FIG. 7 is a diagram showing the relationship between the rubber ball 107 and a data glove 108. The data glove 108 is provided for measuring bending angles of the thumb and fingers (called "fingers" from now on), and the rubber ball 107 is adhered on the inner wall of the data glove 108. Accordingly, the pins 104 move back and forth in the holes 103 in response to the movement of the hand such as clasping or spreading, in the course of which it is unnecessary to use external driving system such as air cylinders.

The electrorheological fluid 106 varies its viscosity in accordance with the intensity of the electric field. That is, the viscosity of the electrorheological fluid 106 filled in the space between the pins 104 and the holes 103 increases or decreases in response to the intensity of the electric field. Thus, the movement of the pins 104 can be freely controlled such as heavy or light movement by varying the flow resistance of the electrorheological fluid 106 with the electric field.

By synchronizing the image display unit 3 with the force display device 1 employing the shape reproducing ball 101 by using the computer 4 as shown in FIG. 7, the operator can grasp a virtual object with a sense of being in reality.

First, the operator gradually closes his fingers. Voltages are sequentially applied to the pins as the fingers touch the virtual object which is generated by the computer 4 and displayed on the image display unit 3, thereby tightening the movement of the pins. The movement of the fingers are measured by the optical fiber sensor 2 attached to the data glove 108, and the measured results are input to the computer 4 which controls the voltages to be applied to the pins 104. Finally, the voltages are applied to the entire pins as the fingers touch the virtual object, so that the pins are locked. This will provide the operator with a sense as if he were really grasping the virtual object displayed as an image, from both visual sense and mechanical force sense. Reversely, while spreading the fingers, the voltages are released so that the pins 104 can move freely. Thus, the data glove 108 is spread by the spreading force of the operator.

Figure 8:
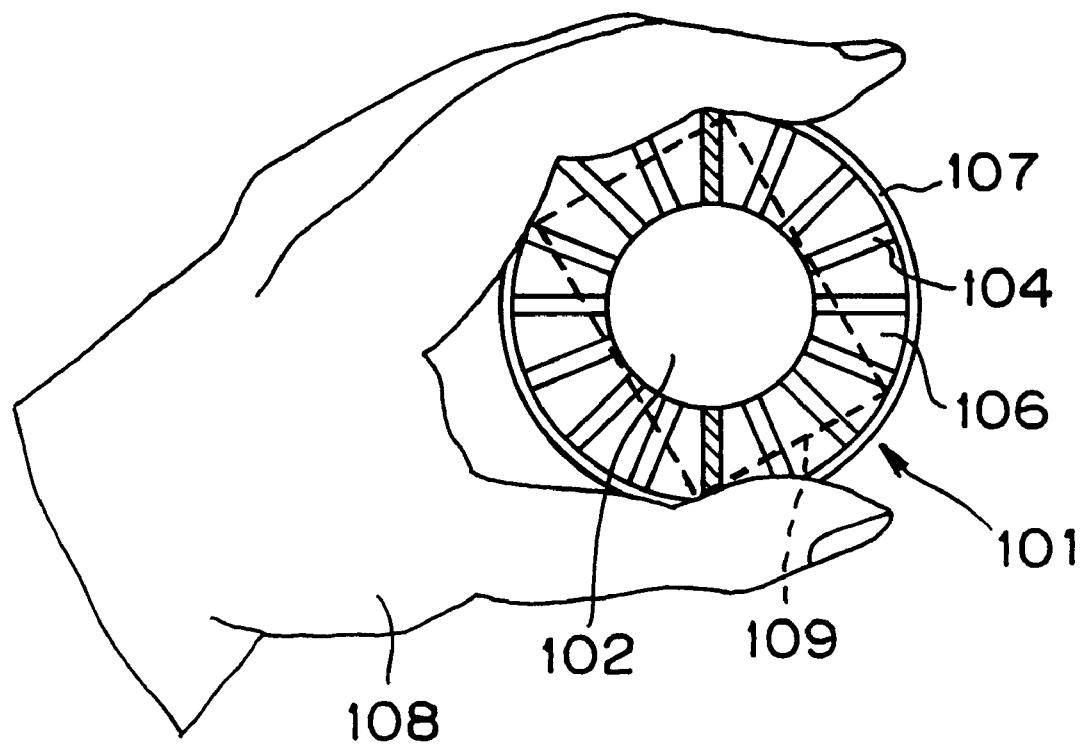
FIG. 8 is a partially cross-sectioned perspective view showing the data glove holding the shape recovery ball having pins radially provided.

FIG. 8 is a partially cross-sectioned view showing a variation of the shape reproducing ball 101. Since the shape reproducing ball 101 comprises pins 104 extending radially, it can display a more real grasping sense. Voltages are sequentially applied to the pins (shaded portions) as the fingers come to touch the virtual object 109 (a rectangular solid in this case).

Since the force display device as shown in FIG. 8 has very high degrees of freedom, it can display the senses of touch and grasp of the virtual object not only to the fingertips but also to the finger pads and the palm. In particular, since the fingers are not constrained in such a manner they are mechanically enveloped, it is comfortable to wear. Furthermore, since the force display device is compact, it can be freely moved in the real space in use.

When using a dispersion electrorheological fluid in which ion exchange resin particles (Mitsubishi Chemical Corporation, MCI gel.K08P, Na type with a particle diameter of 3 $\mu$m and water content of 6 wt %) are distributed into silicone oil (100 cst) with a particle density of 30 vol %, the sense of grasp close to the real one can be gained as soon as grasping the solid virtual object. On the other hand, when using a homogeneous electrorheological fluid composed of liquid crystal silicone (Asahi Chemical Industry Ltd., trial sample AD01), a good sense presentation is gained when grasping a soft virtual object, so that a sense of shaking hands is obtained.

Although the virtual reality system of this embodiment carries out the passive force sense display without using a driving system, it can reproduce more delicate force than the conventional systems using air pressure. Furthermore, it is possible, without using the optical fiber sensor 2, to move fingers by coordinating the force display device with another sense display device such as a voice display device. In this case, the voltage application to the electrorheological fluid 106 is carried out on the basis of the database and program stored in the computer 4. The operator, listening to voices and watching the images displayed on the image display unit 3, moves his or her fingers. Such systems serve as a safe rehabilitation device of fingertips, or a training device of fine operations which can be used to learn the fine operations to an enlarged image, or operations demanding delicate grasping force.

Embodiment 2

Figure 9:
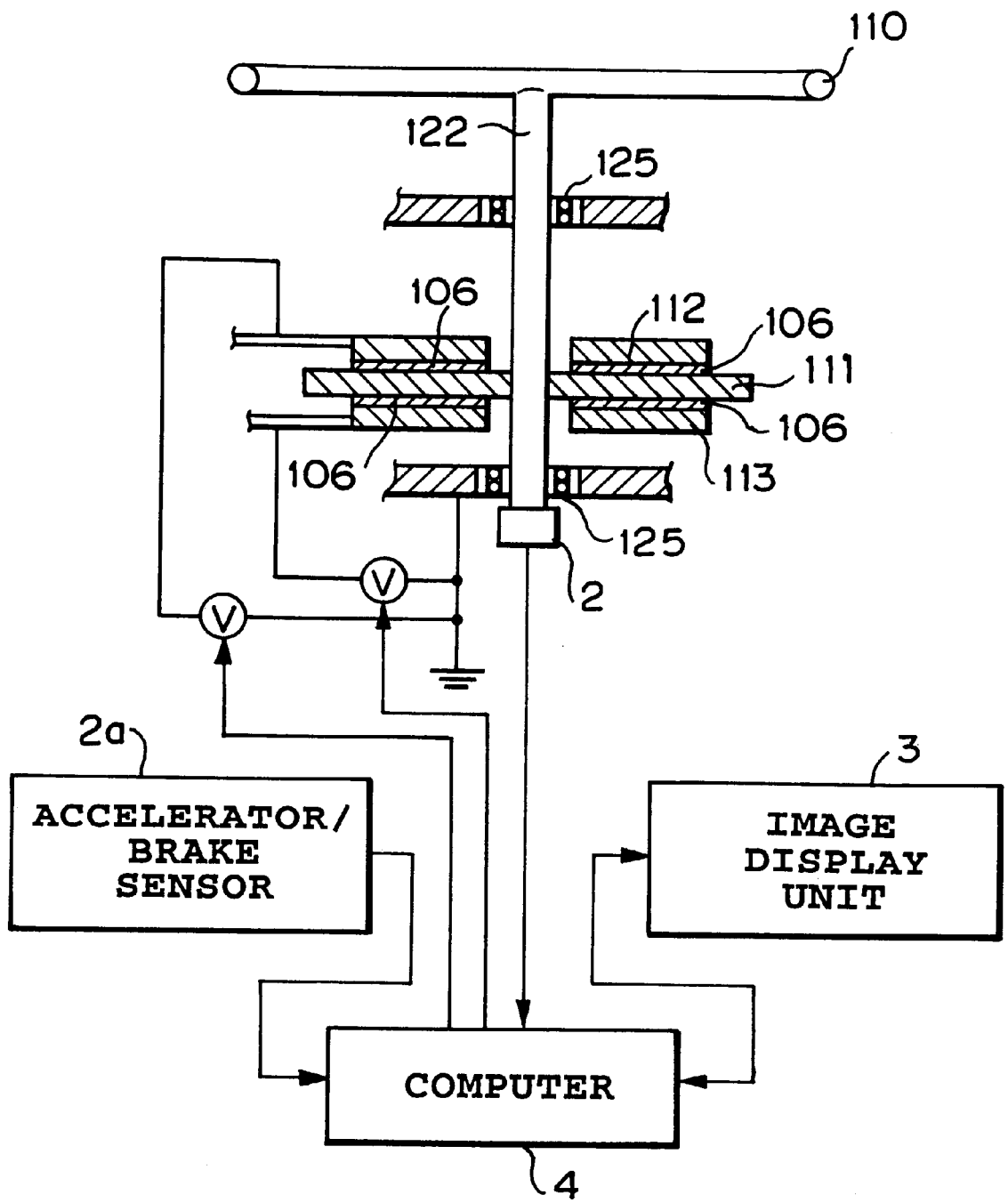
FIG. 9 is a block diagram showing EMBODIMENT 2 of the teleexistence system in accordance with the present invention, and particularly the cross-section section of a passive force display device used in the handling device of an automobile driving simulation system to which the present invention is applied.

FIG. 9 is a cross-sectional view showing EMBODIMENT 2 of the teleexistence system in accordance with the present invention. This embodiment is an example of applying the virtual reality system in accordance with the present invention to an automobile driving simulation system. The simulation system changes the images of the virtual driving in response to handling to provide the steering wheel with force senses accordingly.

In FIG. 9, a disk 111 perpendicularly fixed to the shaft of a freely rotatable wheel 110 is sandwiched between two, upper and lower disks 112 and 113 in parallel with maintaining spaces of 1.0 mm. The wheel 110 has a diameter of 320 mm. The disk 111 is an aluminum disk of 250 mm in diameter, and the disks 112 and 113 are in the form of an aluminum disk of 200 mm in diameter. The electrorheological fluid 106 is filled in the spaces between the disk 111 and the two fixed disks 112 and 113. In addition, independent electric fields are applied to the electrorheological fluid filled in the space between the disk 111 and the fixed disk 112, and to the electrorheological fluid filled in the space between the disk 111 and the fixed disk 113.

Images of the virtual driving of an automobile are shown on the display 3 on the basis of the database and program which have been input to the computer 4 in advance. The signals from the sensor 2 for detecting steering wheel handling and a sensor 2a for detecting acceleration and braking are fed back to the computer 4, so that the images are changed in response to the operation. The intensity of the electric fields to be applied to the electrorheological fluid 106 is calculated by the computer 4 in cooperation with the image and the acceleration and braking. The computer 4 controls the electric fields applied to the electrorheological fluid 106 in accordance with the calculated intensity of the electric fields, thereby varying the flow resistance of the electrorheological fluid 106. As a result, the force sense is provided to the wheel 110.

When using the electrorheological fluid based on the liquid crystal silicone exhibiting the Newtonian flow, which is used in EMBODIMENT 1, excellent reproduction of the senses is achieved when the wheel 110 is rotated suddenly largely or is kept rotated slowly. On the other hand, when using the electrorheological fluid based on the ion exchange resin particles exhibiting the Bingham fluid, good reproduction of the sense of heavy handling during slow traveling, or the sense of delicate handling is achieved. Alternatively, when using the electrorheological fluid based on the liquid silicone between the disk 111 and the upper disk 112, and the electrorheological fluid based on the ion exchange resin between the disk 111 and the lower disk 113, a very vivid sense close to the real sense is obtained by independently controlling the applied voltages in response to the handling; even in this passive force sense display.

Embodiment 3

Figure 10:
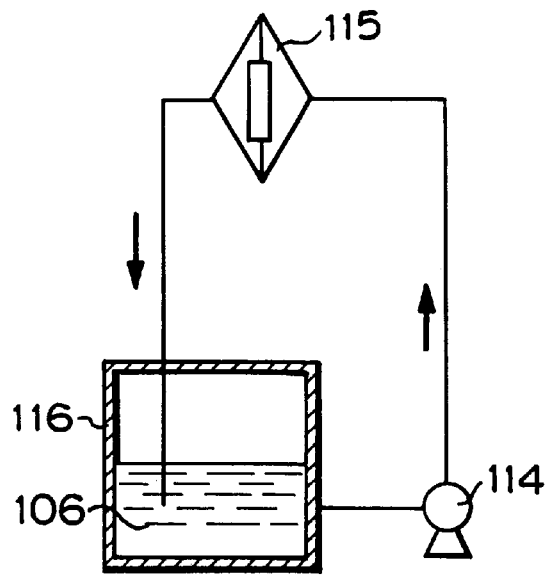
FIG. 10 is a schematic diagram showing a force display device employed in EMBODIMENT 3 of the teleexistence system in accordance with the present invention, wherein the operation principle of the force display system is illustrated which is used in the telereality system adopting an oil hydraulic system employing the electrorheological fluid.

FIG. 10 is a schematic diagram showing a force display device used in EMBODIMENT 3 of a teleexistence system in accordance with the present invention. This embodiment is an example of a telereality system which operates a remote object with a robot grip. FIG. 10 illustrates the operation principle of the force display device.

The telereality system employs a hydraulic system using the electrorheological fluid 106 as a circulating liquid to control the direction and force of the piston output by the intensity of the electric field applied to the electrorheological fluid 106, thereby displaying the piston output to a manipulator on the operator side as a force sense. In FIG. 10, the electrorheological fluid 106 is controlled such that it flows out of a pump 114, circulates the Wheatstone bridge 115, and returns to a tank 116.

Figure 11:
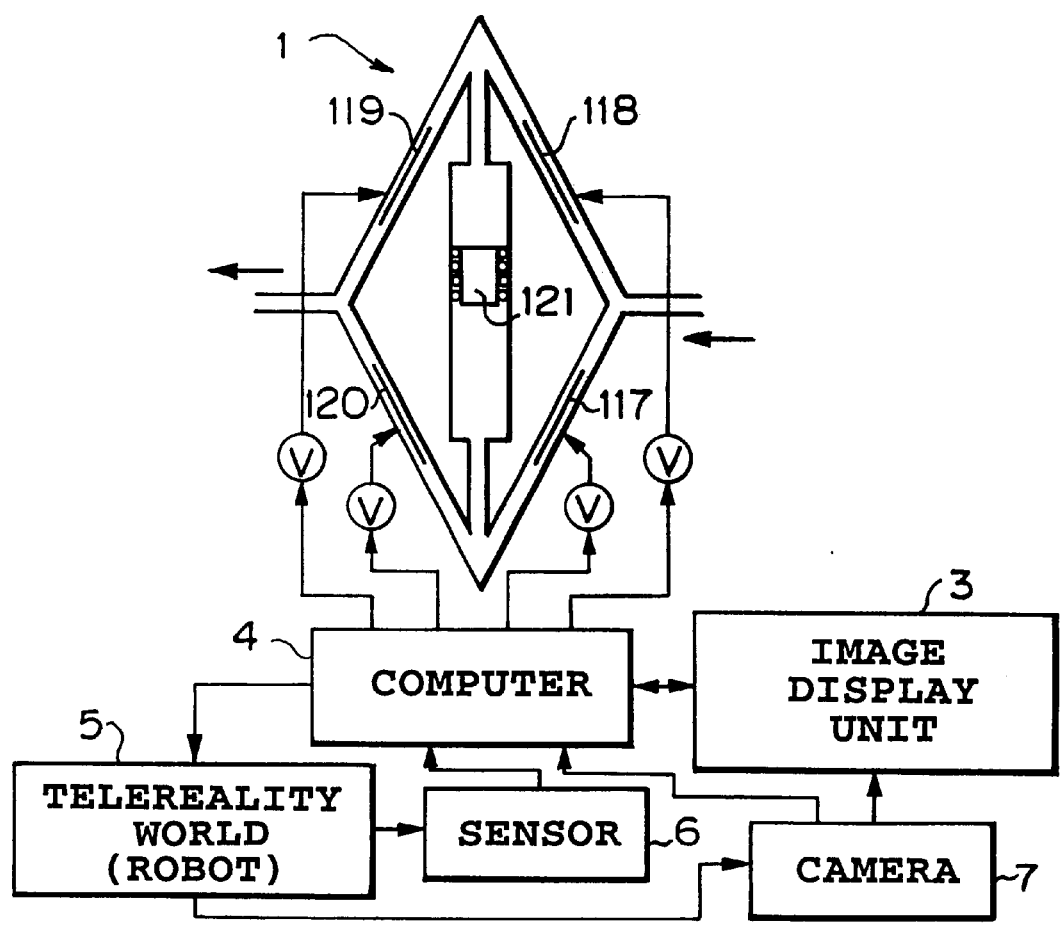
FIG. 11 is a block diagram showing the overall structure of EMBODIMENT 3, wherein a Wheatstone bridge consisting of four electrorheological fluid valves and one piston is illustrated in a cross-sectional view.

FIG. 11 is a cross-sectional view showing the structure of the Wheatstone bridge 115. The Wheatstone bridge 115 includes a piston 121 and four electrorheological fluid valves 117, 118, 119 and 120, each having double cylinder type electrodes. The piston 120 is freely moved by controlling the voltages applied to the four valves. For example, the piston 121 is moved downward by substantially closing the valves 117 and 119 by applying voltages thereto to increase the viscosity of the electrorheological fluid in these valves, and by opening the valves 118 and 120 without applying any voltages, while circulating the electrorheological fluid 106. Reversely, the piston 121 is moved upward by removing the voltages applied to the valves 117 and 119 and applying the voltages to the valves 118 and 120. By controlling the applied voltages in this way, the direction, velocity and force of the piston 121 can be freely controlled. The maximum force of the piston 121 is determined by the performance of the pump 114 and the electrorheological fluid 106.

Figure 12:
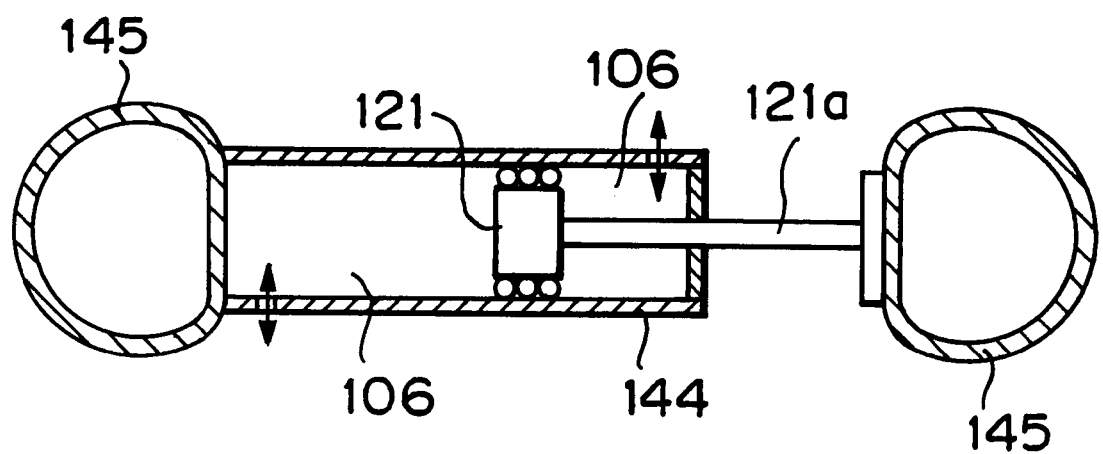
FIG. 12 is a cross-sectional view showing an operator's side grip of the Wheatstone bridge as shown in FIG. 11.

FIG. 12 shows a force display device using a Wheatstone bridge type piston 121. Fingerstalls (or a fingerstall and a thumbstall) 145 are fixed to the ends of a cylinder 144 and a piston rod 121a. This force display device is connected to the computer 4 as the force display device 1 shown in FIG. 11.

The tactile feeling with a remote object can be displayed to the operator by making the signal from the pressure sensor 6 fixed to the grip of the robot 5 in cooperation with the movement of the piston 121, while picking up the remote object and the grip with the camera 7 to display them on the image display unit 3.

The Wheatstone bridge 115 can be made compact using thin flexible pipes, and many Wheatstone bridges can be supplied with the electrorheological fluid from a single pump. Therefore, this method can implement a simple, compact force display device that can provide senses associated with the telereal world having multiple degrees of freedom with much reality. The telereality system in accordance with the present embodiment has an advantage that it is superior in response, in displaying the force sense with a feeling to be really at that place, and in making the system much more compact than the conventional systems which control the oil pressure or air pressure with mechanical fluid valves.

Embodiment 4

Figure 13:
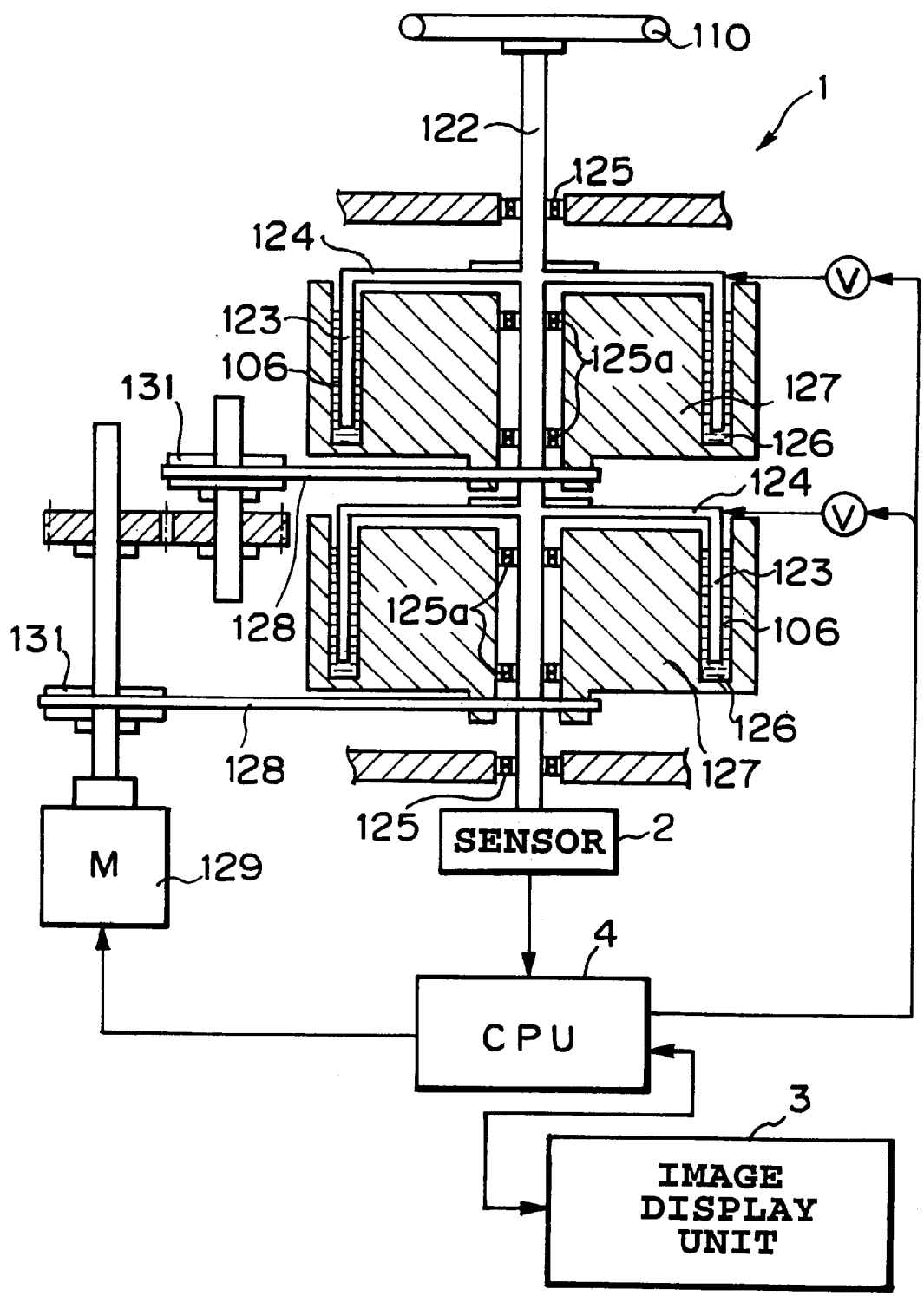
FIG. 13 is a block diagram showing EMBODIMENT 4 of the teleexistence system in accordance with the present invention, and particularly a cross-section of an active force display device employed by the handling system of an automobile driving simulation system to which the present invention is applied.

FIG. 13 is a partially cross-sectioned view showing EMBODIMENT 4 of the teleexistence system in accordance with the present invention. This is an example of the present invention which is applied an automobile driving simulation system, to which displays active force sense. Although the automobile driving simulation system displays the passive force sense in EMBODIMENT 2 as shown in FIG. 9, the present embodiment further displays the active force sense.

In FIG. 13, there are fixed to the shaft 122 of the wheel 110 upper and lower two disks 124, to each of which a cylindrical electrode 123 is attached. The shaft 122 is supported by bearings 125 at upper and lower two positions. Upper and lower two flanges 127, each having a ring-like deep slot 126, are rotatably mounted on the shaft 122 through the intermediary of bearings 125a. Each of the cylindrical electrodes 123 is rotatably inserted into the deep slot 126 in the flange 127, while keeping a 1.0 mm wide space between the inner wall of the deep slot 126. The respective flanges 127 are connected to a motor 129 through belts 128 such that the two flanges rotate in the opposite directions at the same speed.

The electrorheological fluid 106 is filled by a predetermined amount into the spaces between the deep slots 126 and the cylindrical electrodes 123, and the upper and lower cylindrical electrodes 123 are supplied with independent voltages. In addition, an acceleration sensor 2 is attached to the bottom end of the shaft 122 to detect the position and the movement of the wheel 110 in the form of angle and rotational acceleration.

When the upper and lower flanges 127 are rotated at the same speed by the motor 129 without applying any voltages to the cylindrical electrodes 123, rotational forces in the opposite directions and of the same magnitude are produced at the upper and lower cylindrical electrodes 123, thus generating no rotational force on the wheel 110. Subsequently, if a voltage is applied only to the upper cylindrical electrode 123, the viscosity of the electrorheological fluid 106 inserted into the upper deep slot 126 increases, so that the wheel 110 rotates at the force proportional to the increase in the viscosity. Reversely, if a voltage is applied only to the lower cylindrical electrode 123, the wheel 110 rotates in the opposite direction.

By controlling the voltages applied to the upper and lower cylindrical electrodes 123 in this way, the direction and force of the rotation of the wheel 110 can be freely controlled. In particular, since the inertial force can be reduced by using a light material for the cylindrical electrodes 123 and flanges 127, it is possible to generate a rotational force with desired acceleration or oscillations of desired frequencies on the wheel 110.

According to the virtual reality system, the force senses are displayed to the operator by calculating the voltages to be applied to the force display device 1 by the computer 4 in response to the signal from the sensor 2 and the signal to be supplied to the image display unit 3 of the driving simulation, and by supplying the calculated voltages to the cylindrical electrodes 123. This makes it possible to provide the operator with force senses with higher reality than the automobile driving simulation system of EMBODIMENT 2. Incidentally, the images on the image display unit 3 are generated by the computer graphics, and move in response to the signals from sensors associated with the accelerator or brakes among other signals.

Embodiment 5

Figure 14:
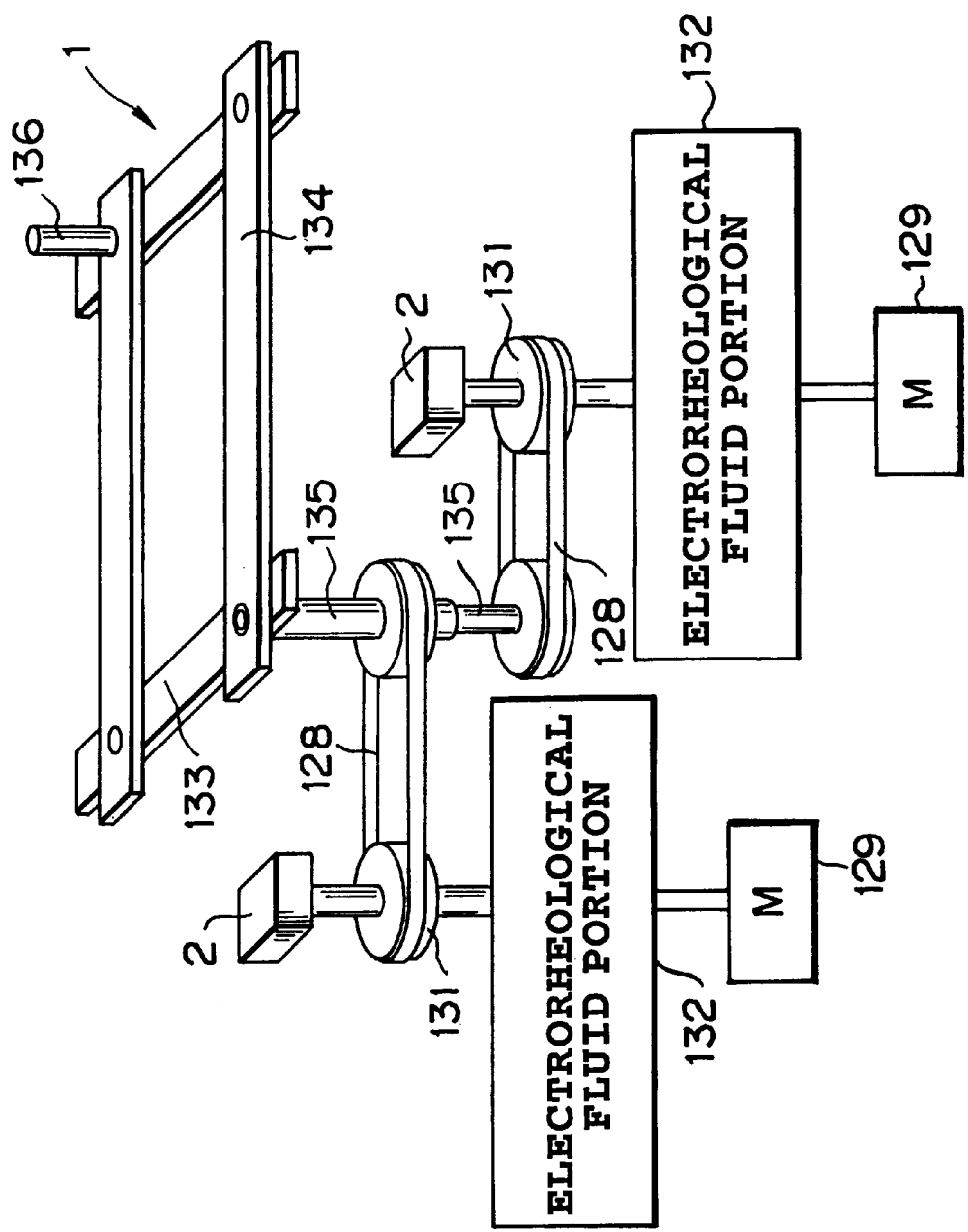
Figure 15:
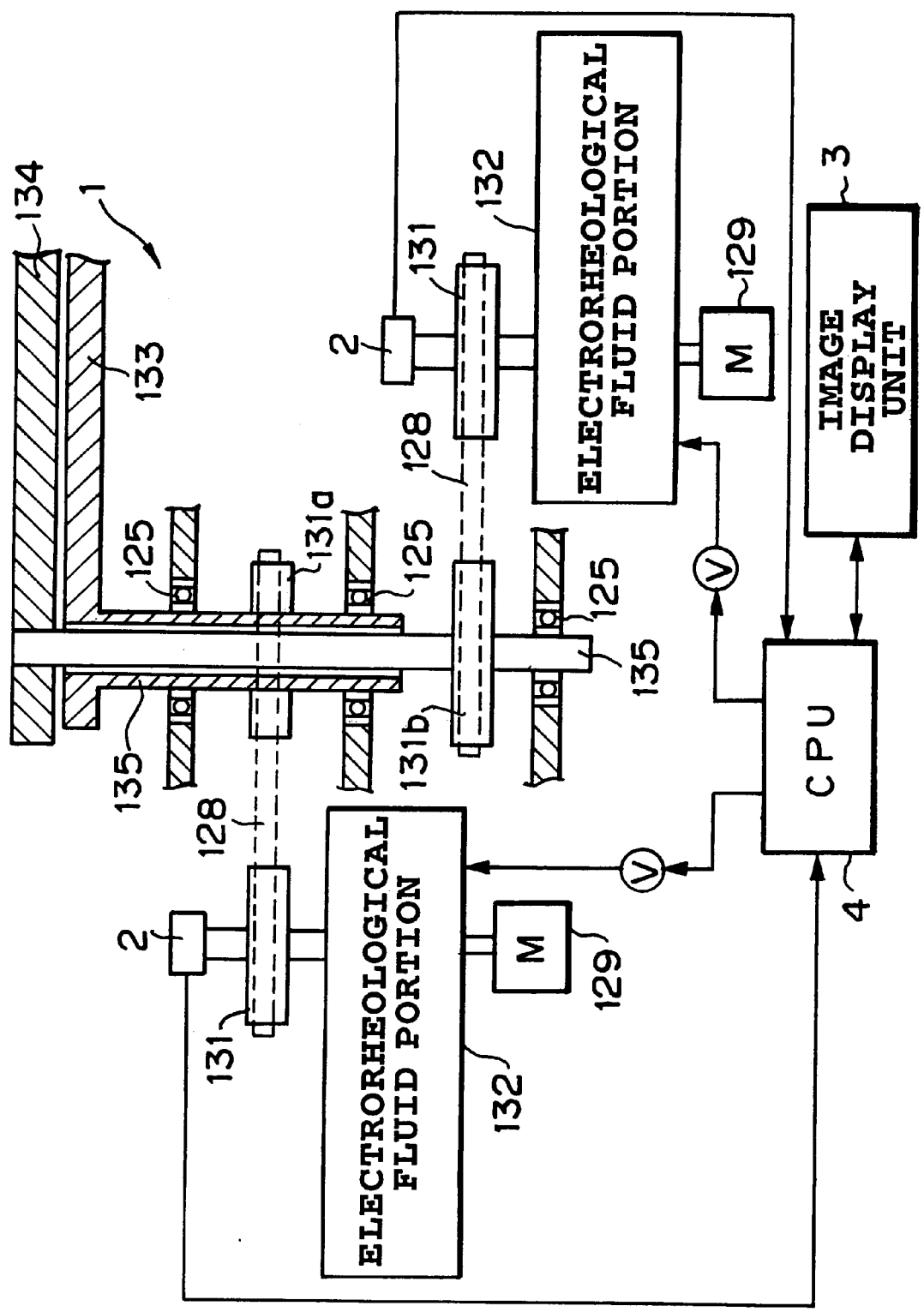

FIGS. 14 and 15 are diagrams showing EMBODIMENT 5 of the teleexistence system in accordance with the present invention. FIG. 14 is a perspective view showing the force display device 1 that can display the force sense on an X-Y plane, and FIG. 15 is a block diagram showing the virtual reality system employing the force display device 1. The force display device 1 in accordance with the present embodiment employs a parallel linkage having two devices, to each of which a pulley 131, in place of the wheel 110 as shown in FIG. 13 is attached.

In FIGS. 14 and 15, the reference numeral 132 designates electrorheological fluid portions into which the electrorheological fluid 106 is filled. These portions have the same structure as the corresponding portions in FIG. 13. In other words, they are structured such that the electrorheological fluid 106 is filled into spaces between the deep slot 126 formed in the flange 127 and the cylindrical electrode 123 inserted thereinto. Thus, the electrorheological fluid portions 132 vary the output torques of the motors 129 in response to the voltages applied thereto, and transmit the varied torques to the pulleys 131.

Pulleys 131a and 131b are attached to two adjacent links 133 and 134 among the four links constituting the parallel linkage (which forms a parallelogram). The pulleys 131a and 131b are linked to the pulleys 131 via belts 128 to transmit their rotational forces to the adjacent links 133 and 134 of the parallel linkage. The links 133 and 134 are rotatably fixed to a double coaxial shaft 135. The four links of the parallel linkage are rotatably linked to each other, and a lever 136 is fixed to a position opposite to the shaft 135. Accordingly, the lever 136 can freely move on the X-Y plane around the shaft 135 in a range limited by the length of the frames, when no rotational force is transmitted from the pulleys 131.

On the other hand, when the rotational force is transmitted from both or one of the pulleys 131 of the electrorheological fluid portions 132 to the pulleys 131a and/or 131b of the parallel linkage, the links 133 and/or 134 rotate accordingly, so that the force is transmitted to the lever 136, thus moving the lever 136.

The sensor 2 detects the angle and angular acceleration of the links 133 and 134 around the shaft 135, thereby outputting the position and moving speed of the links 133 and 134.

With this arrangement, the magnitude and direction of the forces transmitted to the lever 136 can be controlled by applying voltages calculated by the computer 4 to the electrorheological fluid portions 132 in response to the position and movement of the lever 136 while rotating the two motors 129 at a fixed speed.

For example, assuming that the lever 136 is a knob of a virtual room door displayed on the image display unit 3, the force sense when the door is opened or closed can be presented through the lever 136. More specifically, the data associated with the delicate force sense in accordance with the movement of the door and the oscillation when the door bumps against the wall are stored in the computer 4 in advance, and the voltages calculated through the calculation processing by the computer 4 are applied to the electrorheological fluid portions 132.

Embodiment 6

Figure 16:
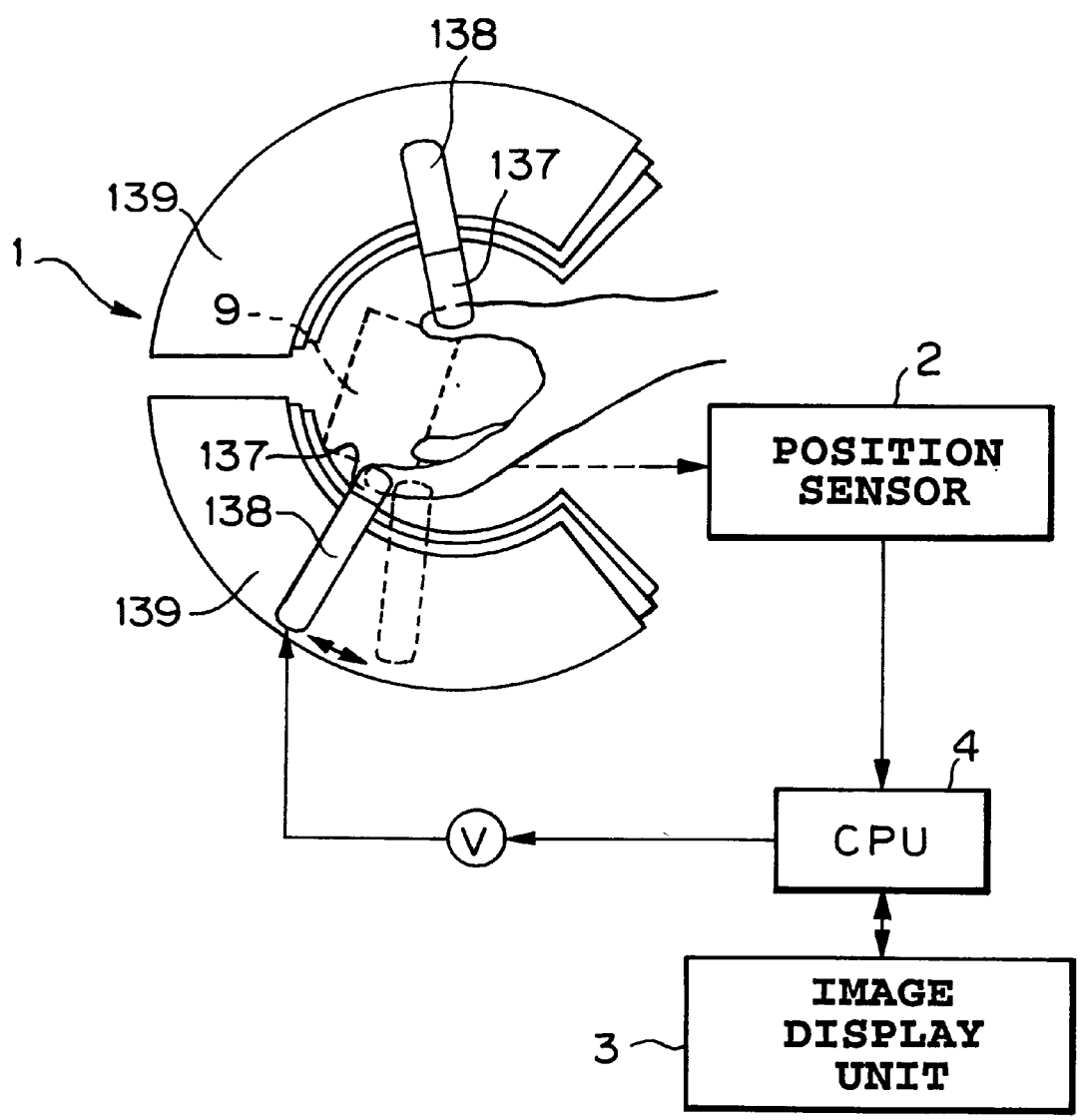
Figure 17:
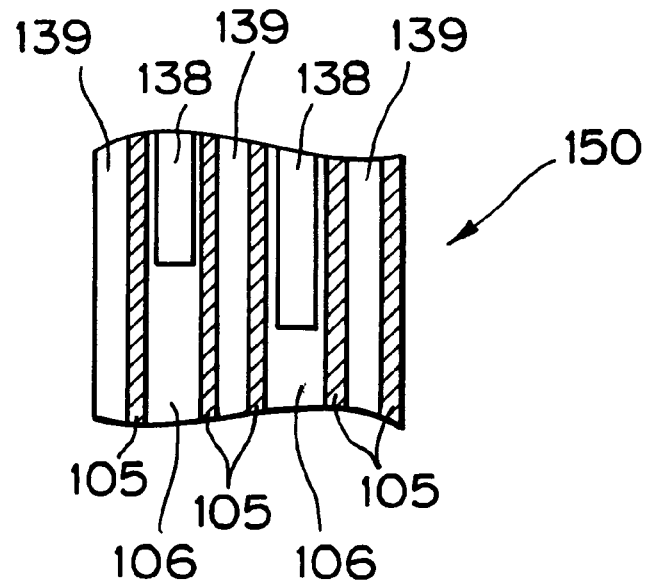
Figure 18:
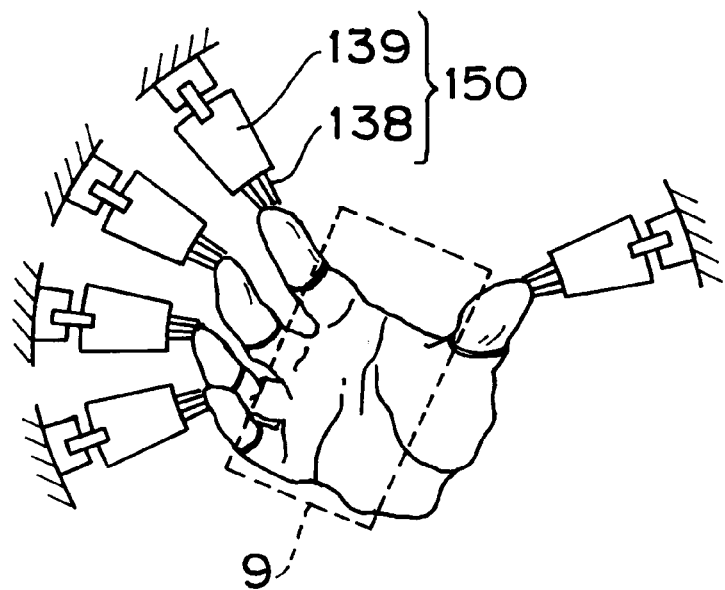

FIGS. 16–18 are diagrams showing EMBODIMENT 6 of the teleexistence system in accordance with the present invention. FIG. 16 shows the overall configuration of the system with the force display device 1 being centered, FIG. 17 shows parallel electrodes 139, and FIG. 18 shows the state in which a virtual object 9 is grasped with the thumb and four fingers. This embodiment provides the operator through the force display device 1 with the forces exerted on the fingers when the soft virtual object 9 is held. The force display device 1 also displays the force sense by varying the viscosity of the electrorheological fluid when the intensity of the electric field applied to the electrorheological fluid is controlled.

In these figures, the thumb and fingers wear electrode units 150, each of which comprises metallic film electrodes 138 and metallic parallel plate electrodes 139. First ends of the metallic film electrodes 138 are connected to the backs of the fingers via metallic insulating portions 137, and second ends thereof are deeply inserted into the spaces of the parallel plate electrodes 139. The parallel plate electrodes 139 are provided with thin, insulating, synthetic nonwoven fabrics stuck to their surfaces which serve as spacers 105. The spacers 105 insulate the metallic film electrodes 138 from the parallel plate electrodes 139, and keep the spaces constant, as well. Furthermore, the electrorheological fluid 106 is filled in the spaces between the metallic film electrodes 138 and the parallel plate electrodes 139.

Independent voltages calculated by the computer 4 are supplied between the metallic film electrodes 138 and parallel plate electrodes 139, thereby controlling the intensity of the electric fields applied to the electrorheological fluid 106. In addition, the movement of the fingers is detected by the position sensor 2, and the output signal of the sensor 2 is fed back to the computer 4.

With such an arrangement, the force senses when grasping the virtual object 9 generated on the image display unit 3 by the computer graphics are displayed to the operator by supplying the electrodes 138 and 139 with the voltages calculated by the computer 4 in response to the movement of the fingers.

Although it is difficult for this method to display the active force senses, the method can have three degrees of freedom in the directions, i.e., upwards and downwards, rightwards and leftwards, and around the axis normal to the sheet. The forces exerted on the fingers, that is, the displayed forces, act in the directions normal to the finger pads. To generate desired display forces by the conventional manipulator type display devices, it is necessary to individually control actuators by using a transform matrix, which results in a complicated system. The force display device of this embodiment, however, can display the senses involved in holding objects of complicated shapes in various grasping shapes without any special control, because the flow resistance and the display forces are approximately in the same direction since the metallic film electrodes 138 are kept normal to the fingers.

Embodiment 7

Figure 19:
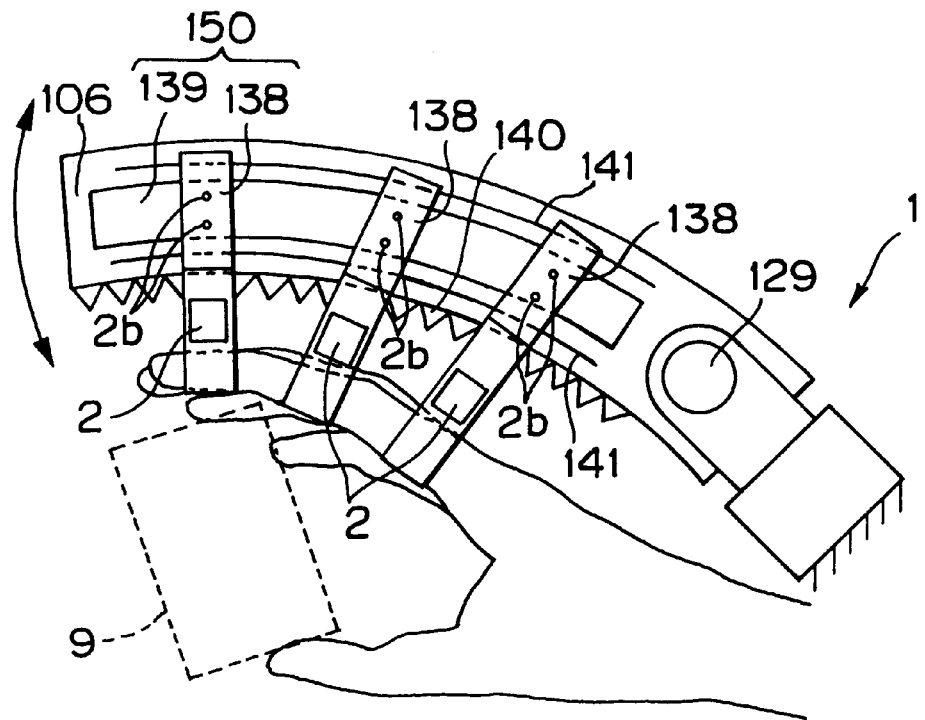
FIG. 19 is a partially sectional view of a force display device employed in EMBODIMENT 7 of the teleexistence system in accordance with the present invention.

FIG. 19 shows a force display device used in EMBODIMENT 7 of the teleexistence system in accordance with the present invention. In this embodiment, each electrode unit 150 comprises metallic film electrodes 138, parallel plate electrodes 139 and an electrorheological fluid 106 filled in the spaces therebetween. A force sensor (distortion sensor) 2 is attached to each of the metallic film electrodes 138 near the finger, and a motor 129 is mounted on the electrode unit 150 at a position near the wrist.

With this arrangement, the display of the active force senses can be implemented by the feedback control of the applied voltages to the electrorheological fluid 106 and of the movement of the parallel plate electrodes 139 in response to the information from the force sensors 2. Since the active senses involved in holding the virtual object 9 with fingers are primarily displayed while opening the fingers, many states can be displayed, although the degrees of freedom of the motor 129 is limited to one per finger.

EMBODIMENT 6 described above has a problem in that the metallic film electrodes 138 are gradually pulled out of the parallel plate electrodes 139 with the bend of the fingers, thus reducing the effective areas of the electrodes. To improve this, it is necessary to adjust every moment the intensity of electric fields applied to the electrorheological fluid 106 by measuring the length of the metallic film electrodes 138, or to set the metallic film electrodes 138 very long. The present embodiment can solve this problem, because the electrode units 150 can be shifted by the motor 129. It is possible to control such that the effective electrode areas are kept as large as possible and nearly constant by detecting the bending amounts of the fingers by the sensors 2b fixed to the metallic film electrodes 138, and by controlling the position of the electrode units 150 by the motor 129, for example. Here, LEDs can be used as the position sensors 2b.

Embodiment 8

Figure 20:
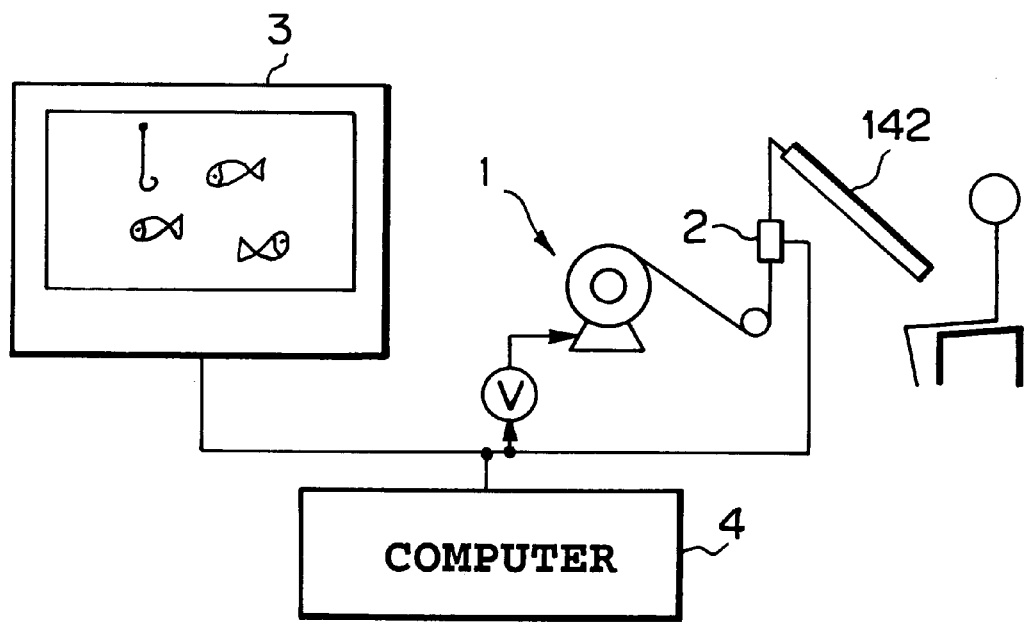
FIG. 20 is a schematic diagram of EMBODIMENT 8 of the teleexistence system in accordance with the present invention, in which the present invention is applied to a virtual fishing game.

FIG. 20 is a block diagram showing EMBODIMENT 8 of the teleexistence system in accordance with the present invention. EMBODIMENT 8 is an example in which the virtual reality system is applied to a fishing game.

An operator carries a fishhook to the mouth of a targeted fish displayed on the image display unit 3 by handling a fishing rod 42. The fishhook is synchronized with the image on the image display unit 3 by the computer 4. Specifically, the computer 4 includes database and program so that when the fishhook is carried well to the mouth of the fish, it will nibble at the bait, and the feeling of a strike and tug can be obtained in response to the action of the fish.

It can display the feeling of a tug with a reality in accordance with the kind and size of a fish using a tension sensor 2 and the force display device 1 employing the electrorheological fluid even if a short rigid fishing rod is used. For example, a force display device can be used which adjusts the tension by changing the transmitted torque by controlling the intensity of the electric field applied to the electrorheological fluid filled in the space between two parallel rotatable disk electrodes.

Industrial Applicability

The present invention relates to a system in which the flow resistance of the electrorheological fluid is synchronized with images (virtual world) generated by a computer or with a telereal world (teleexistence) that really exists and can be contacted through the intermediary of a robot, so that the force senses are displayed to an operator. It can achieve the display of movements with multiple degrees of freedom with a feeling of reality in a simple and compact device. This system can be applied to various fields such as design, education, training, amusement, hazardous operations, micromanipulation/super-micromanipulation, as a virtual reality or telereality (teleexistence) system. In the amusement, for example, it can be applied to skiing, fishing, flight, walking in the sea, golf, baseball, cycling, or the like. In the training, it can be applied to automobile driving, space work; in the education, it can be applied to the standardization of skilled jobs; in the hazardous operation or micromanipulation, it can be applied to nuclear material handling, deep-sea operations, or working, assembling and processing of fine objects; in the medical treatment, it can be applied to rehabilitation of muscular strength, operations under camera monitor; in the design, it can be applied to the design of handleability of equipment or furniture. Furthermore, the force display device in accordance with the present invention serves as one of the fundamental techniques of multimedia utilizing high speed networks: it serves as an input/output device of an information terminal like a mouse, keyboard, display or speaker, thereby making it possible to transmit information on haptic senses such as touch, grasp or rub in addition to the conventionally transmitted information like characters, images or voices.

What is claimed is:

1. A teleexistence system including a virtual reality system and a telereality system; the teleexistence system comprising:

a force display device for displaying a force sense to an operator in response to the operator's continuous interaction with an environment provided to the operator in the form of an image;

an image display unit for displaying said image in response to a given image signal; and a computer for generating a force sense signal corresponding to said force sense, wherein said force display device includes control means for electrically changing the flow resistance of an electrorheological fluid in response to the force sense signal, and force providing means for providing said operator with a force controlled by said flow resistance.

2. The teleexistence system as claimed in claim 1, further comprising a sensor for detecting mechanical variables of said force display device, wherein an output signal from said sensor is fed back to said computer, so that said computer controls at least one of said force display device and said image display unit in response to the output signal from said sensor.

3. The teleexistence system as claimed in claim 2, wherein said force display device comprises active force providing means for outputting a force display corresponding to the control in which said control means changes the flow resistance of the electrorheological fluid.

4. The teleexistence system as claimed in any one of claims 1–3, wherein said environment provided in the form of an image is a telereal world, and said teleexistence system further comprises image pick up means for outputting said image signal by picking up said telereal world, and a telereal world sensor for detecting mechanical actions in said telereal world and for feeding an output signal of said telereal world sensor back to said computer, and wherein said computer generates said force signal in response to at least one of said image signal output from said image pick up means and said output signal from said telereal world sensor to provides said force signal to said force display device.

5. The teleexistence system as claimed in any one of claims 1–3, wherein said environment provided in the form of an image is a virtual world, and said computer stores images of said virtual world in advance, supplies said image signal to said image display unit in response to said images of said virtual world, and supplies said force signal to said force display device in response to said images of said virtual world.

6. The teleexistence system as claimed in claim 1, wherein said electrorheological fluid is an electrorheological fluid exhibiting Bingham fluid when electric field is applied to said electrorheological fluid.

7. The teleexistence system as claimed in claim 1, wherein said electrorheological fluid is an electrorheological fluid exhibiting Newtonian flow when electric field is applied to said electrorheological fluid.

8. The teleexistence system as claimed in claim 1, wherein said electrorheological fluid is composed of an electrorheological fluid exhibiting Bingham fluid and an electrorheological fluid exhibiting Newtonian flow when electric field is applied to said electrorheological fluid.

9. The teleexistence system as claimed in claim 1, wherein said force providing means is in the form of a ball.

10. The teleexistence system as claimed in claim 1, further comprising speech output means for outputting a speech related to said image.

11. The teleexistence system as claimed in claim 1, wherein said force providing means is in the form of a handle of a car.

12. The teleexistence system as claimed in claim 1, wherein said force providing means gives a tactile sense by pushing the operator's fingers.

13. The teleexistence system as claimed in claim 1, wherein said force providing means comprises a fishing rod and said force providing means gives a tension force to said fishing rod.

14. The teleexistence system as claimed in claim 1, wherein said control means in which said electrorheological fluid is filled in a space between two electrodes controls the change of the flow resistance of said electrorheological fluid by applying an electric field to said electrorheological fluid.

15. The teleexistence system as claimed in claim 14, wherein said two electrodes are provided stationarily.

16. The teleexistence system as claimed in claim 14, wherein one of said two electrodes is provided stationarily and the other of said two electrodes is movable.

17. A method for displaying a force sense to an operator in response to the operator's continuous interaction with an environment provided to the operator in the form of an image in a teleexistence system including a virtual reality system and a telereality system; the teleexistence system comprising an image display unit, a computer, and a force display device including a control unit and a force providing unit, said method comprising the steps of:

displaying said image, in response to a given image signal, on said image display unit; generating a force sense signal corresponding to said force sense;

changing electrically the flow resistance of an electrorheological fluid in response to the force sense signal, generated by said control unit, and providing said operator with a force controlled by said flow resistance.

18. The method as claimed in claim 17, wherein said teleexistence system further comprises a sensor for detecting mechanical variables of said force display device, said method further comprising steps of feeding back the output signal from said sensor to said computer and controlling by said computer at least one of said force display device and said image display unit in response to the output signal from said sensor.

19. The method system as claimed in claim 18, wherein said force display device further comprises a driving system, said method further comprising a step of driving said force providing unit by said driving system.

20. The method system as claimed in the claim 17, wherein said environment provided in the form of an image is a telereal world, and said teleexistence system further comprises an image pick up unit for picking up said telereal world and a telereal world sensor, said method further comprising steps of outputting said image signal from said image pick up unit, detecting mechanical actions in said telereal world by said telereal world sensor, feeding an output signal of said telereal world sensor back to said computer, and generating said force signal in response to at least one of said image signal output from said image pick up and said output signal from said telereal world sensor to provide said force signal to said force display device.

21. The method as claimed in claim 17, wherein said environment provided in the form of an image is a virtual world, and said computer stores images of said virtual world in advance, said method further comprising steps of supplying said image signal to said image display unit in response to said images of said virtual world, and supplying said force signal to said force display device in response to said images of said virtual world.

22. The method as claimed in claim 17, wherein said electrorheological fluid is an electrorheological fluid exhibiting Bingham fluid when electric field is applied to said electrorheological fluid.

23. The method as claimed in claim 17, wherein said electrorheological fluid is an electrorheological fluid exhibiting Newtonian flow when electric field is applied to said electrorheological fluid.

24. The method as claimed in claim 17, wherein said electrorheological fluid is composed of an electrorheological fluid exhibiting Bingham fluid and an electrorheological fluid exhibiting Newtonian flow when electric field is applied to said electrorheological fluid.

25. The method as claimed in claim 17, wherein said force providing means is in the form of a ball.

26. The method as claimed in claim 17, wherein said teleexistence system further comprises a speech output unit, said method further comprising a step of outputting a speech related to said image by said speech output unit.

27. The method as claimed in claim 17, wherein said force providing unit is in the form of a handle of a car.

28. The method as claimed in claim 17, wherein said force providing unit gives a tactile sense by pushing the operator's fingers.

29. The method as claimed in claim 17, wherein said force providing unit comprises a fishing rod and said force providing unit provides a tension force to said fishing rod.

30. The method as claimed in claim 17, wherein said control unit in which said electrorheological fluid is filled in a space between two electrodes controls the change of the flow resistance of said electrorheological fluid by applying an electric field to said electrorheological fluid.

31. The method as claimed in claim 30, wherein said two electrodes are provided stationarily.

32. The teleexistence system as claimed in claim 30, wherein one of said two electrodes is provided stationarily and the other of said two electrodes is movable.

33. A computer program product having program code means recorded therein, said program code means can be read by a computer included in a teleexistence system including a virtual reality system and a telereality system; the teleexistence system displaying a force sense to an operator in response to the operator's continuous interaction with an environment provided to the operator in the form of an image and comprising an image display unit for displaying said image in response to a given image signal and a force display device for providing said operator with a force controlled by a flow resistance of an electrorheological fluid which is changed in response to a force signal, said program code means comprising:

program code means for generating said force sense signal by said computer, and program code means for synchronizing said image display unit and said force display device.

34. The computer program product as claimed in claim 33, wherein said program code means further comprises program code means for giving said image signal to said image display unit.

* * * * *